Figure 1:
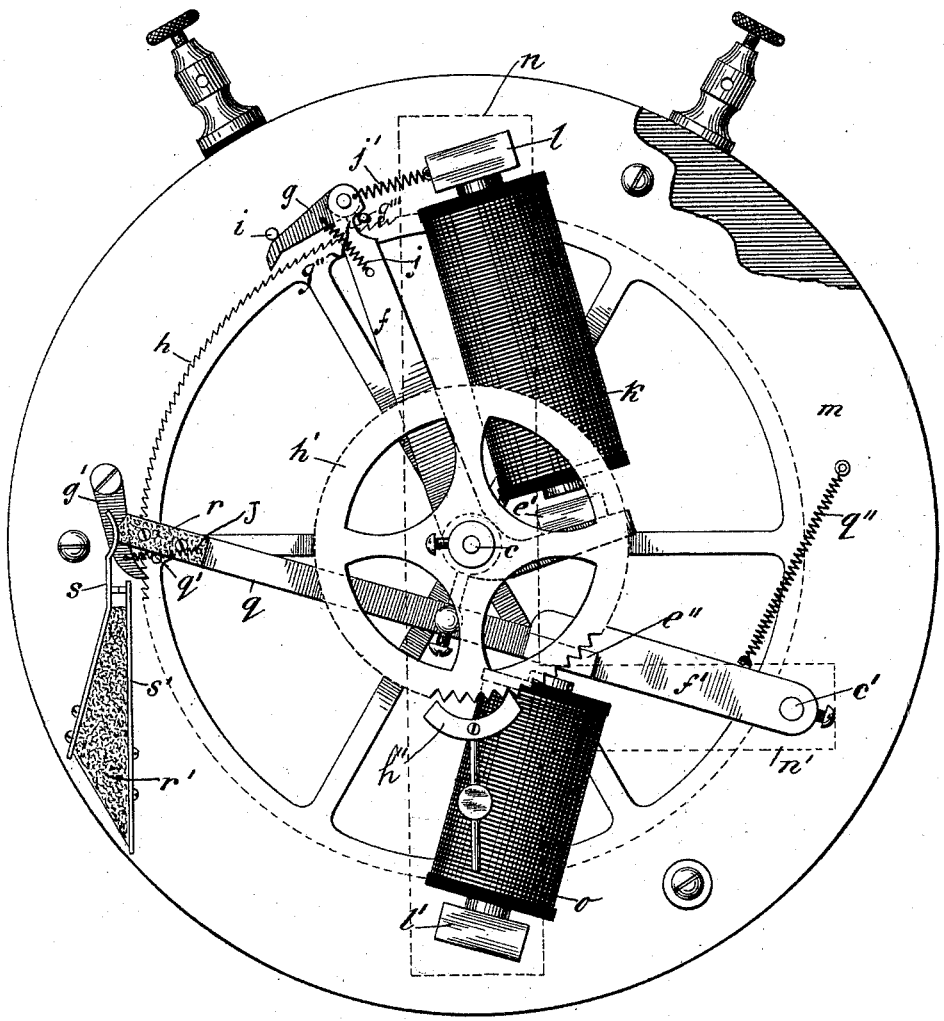
Figure 1A:
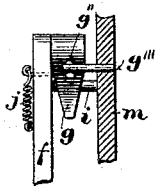

(Model.) 4 Sheets—Sheet 1.
C. W. AYTON.
ELECTRICAL TRANSMITTER FOR TELEMETER SYSTEMS.
No. 498,871. Patented June 6, 1893.

Witnesses:
William H. Stubbs
W. H. Courtland

Inventor:
Charles W. Ayton
By his attorney
Edward P. Thompson (Model.)

C. W. AYTON.
ELECTRICAL TRANSMITTER FOR TELEMETER SYSTEMS.

No. 498,871. Patented June 6, 1893.

Witnesses:
W. F. Courtland
Nellie L. Pope

Inventor:
Chas. W. Ayton
By his Attorney
Edward P. Thompson (Model.)   4 Sheets—Sheet 3.
C. W. AYTON.
ELECTRICAL TRANSMITTER FOR TELEMETER SYSTEMS.
No. 498,871.   Patented June 6, 1893.
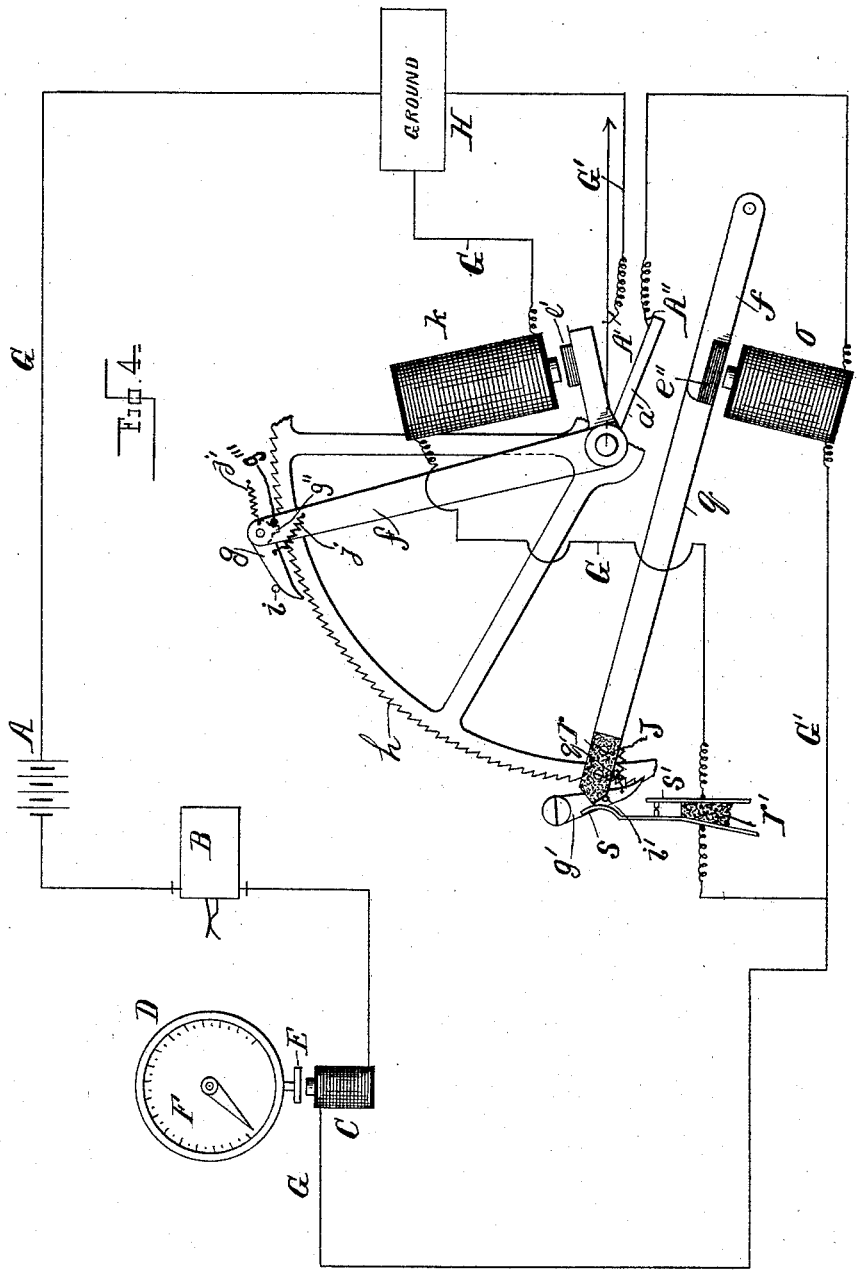
Witnesses
W. H. Courtland
Nellie L. Pope.
Inventor
CHARLES W AYTON
BY HIS ATTORNEY
Edward P. Thompson (Model.)
4 Sheets—Sheet 4.
C. W. AYTON.
ELECTRICAL TRANSMITTER FOR TELEMETER SYSTEMS.
No. 498,871.　　　　　　　　Patented June 6, 1893.
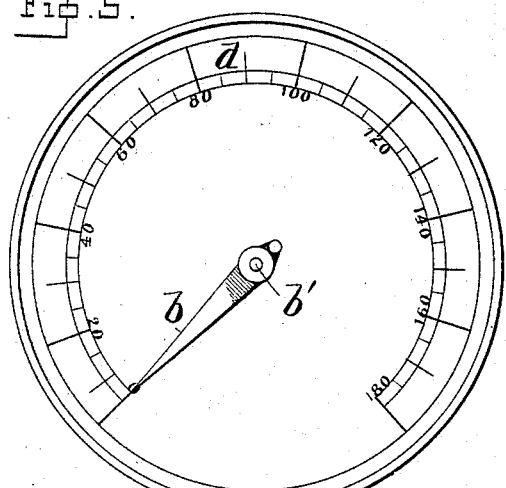
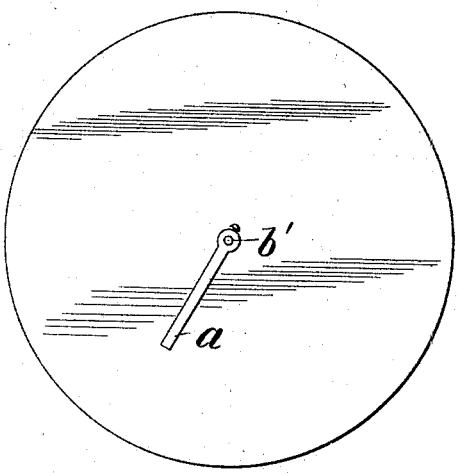
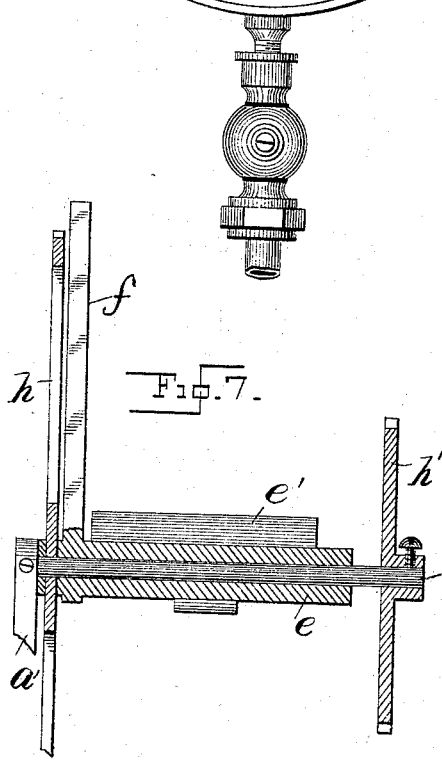
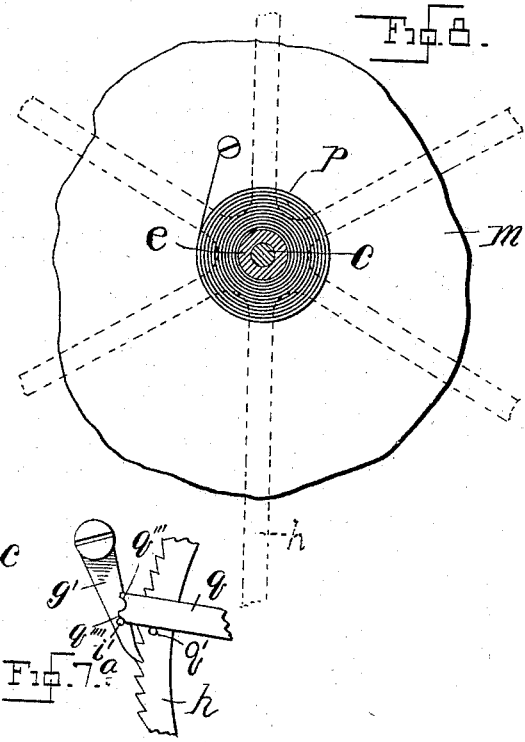
Witnesses
W. H. Courtland
Nellie L. Pope
Inventor
Chas. W. Ayton
By his Attorney
Edward P. Thompson

UNITED STATES PATENT OFFICE.

CHARLES WILLIAM AYTON, OF NEW YORK, N. Y.

ELECTRICAL TRANSMITTER FOR TELEMETER SYSTEMS.

SPECIFICATION forming part of Letters Patent No. 498,871, dated June 6, 1893.

Application filed February 10, 1892. Serial No. 420,933. (Model.)

*To all whom it may concern:*

Be it known that I, CHARLES WILLIAM AYTON, a citizen of the United States, and a resident of the city, county, and State of New York, have invented certain new and useful Improvements in Electrical Transmitters for Telemeter Systems, of which the following is a specification.

My present invention relates to the construction of a transmitter for use in a system of telemeters for indicating at a distance, the readings of a steam gage, ammeter, voltmeter, or similar instrument which is employed for measuring mechanical, pneumatic, electrical or other energy.

The object of the invention in general is to provide simplicity of mechanical construction and such sufficiency of operation as to recommend it to commercial use.

By the particular object of the invention is to be understood that by which with but one main line and one local circuit, which may be either a branch from the main or a circuit from a local generator, I can indicate at a distant point or points those indications which will show to the reader exactly how the steam gage stands, which may be miles away from the indicator. As the principle of construction remains the same, whether it is used in conjunction with a steam gage, electric meter, or similar device, I have shown and described it alone in conjunction with the steam gage, in order to reduce as much as possible the volume of drawings and description.

Certain features shown but not claimed in this application are claimed in my application Serial No. 435,829, filed June 7, 1892, for a receiver for telemeter system.

In order to set forth the exact nature of the invention, the accompanying drawings are furnished showing just how one versed in the art may carry out the invention. The drawings are made from a model which has been in successful operation.

Figure 2:
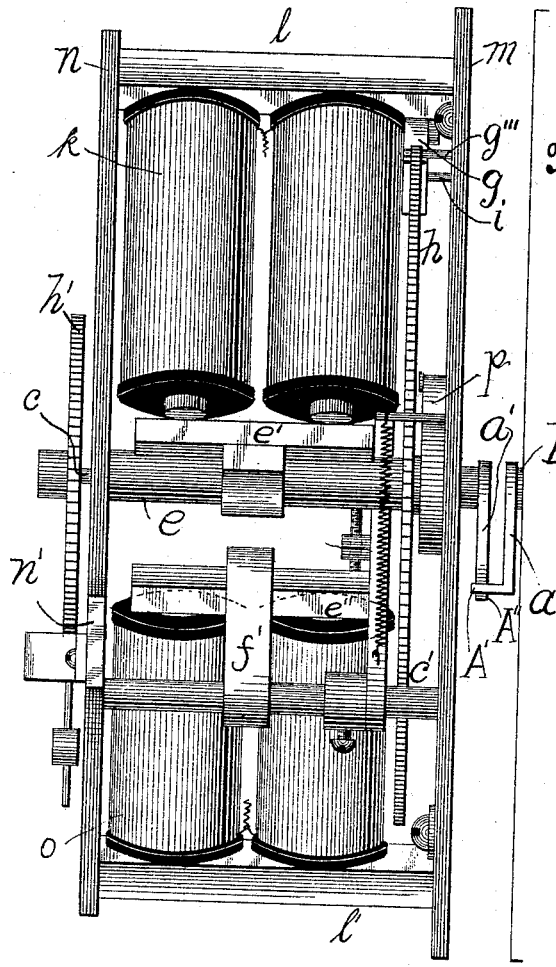
Figure 3:
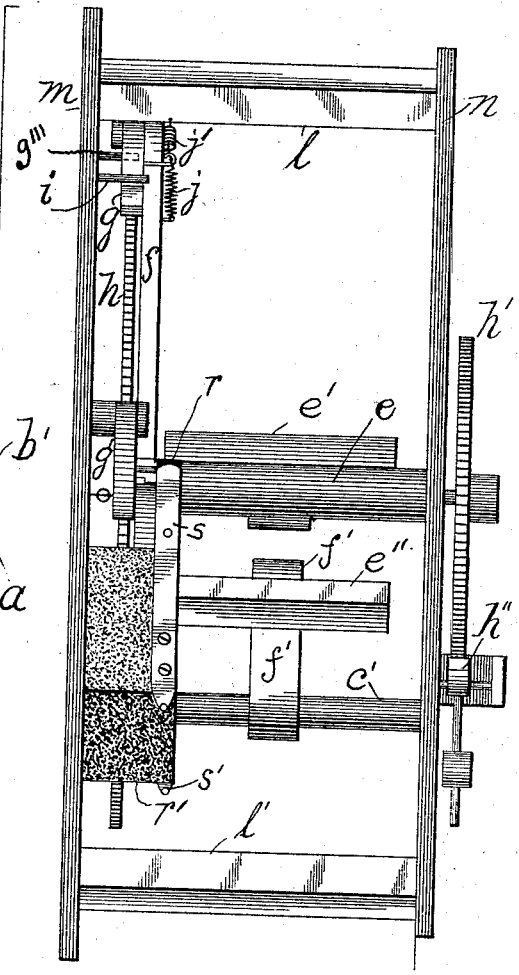

Figure 1, is an elevation showing the mechanism of the device more fully than shown in any other single figure. It is the device which is built upon the back of any given meter, such as a steam gage. In order that as much as possible may be shown in this figure certain forward parts are shown in dotted lines indicating such parts as having no substance, while certain other parts are partly broken away. Fig. 1$^a$ is a view of a part of the device partly in section, and with parts broken off. It brings out the fact clearly, that the pin $g'''$ is attached to the plate $m$, and the pin $g''$ to the pawl $g$. Figs. 2, and 3, are respectively side elevations from the right and left of Fig. 1, each element being projected from Fig. 1, so that they are drawn to the same scale. Fig. 4, sets forth in a concise manner, the path of the electric currents, and their connections so that they may be understood and followed all in one figure. Only so much of the mechanical construction of the various parts is shown that will identify them to the figures shown on other sheets. The figure may therefore be called one which is partly in diagram. Figs. 5, 6, are respectively front and back elevations of the steam gage on a greatly reduced scale. By means of a section of the instrument through the main arbor of the same, Fig. 7, brings out the internal construction not seen in any of the other figures. In order to economize space on the sheet, only some of the features are represented. Fig. 7$^a$ shows a detail in elevation. It is added in order to bring out any details of construction not shown in other figures. Parts shown in Fig. 1, belonging to the construction are omitted, as for instance the insulation $r$ and springs. Fig. 8, is intended to show the connections of the coil spring $p$, which acts in opposition to the large wheel seen in Fig. 1. The dotted lines indicate the spokes of the said wheel.

Some of the subject matter herein shown but not claimed, is necessarily, well known in the art, such for example as magnets, levers, &c., and certain combinations thereof; while also some of the matter shown but not claimed, is claimed in application Serial No. 422,956, filed February 27, 1892, by myself. Further matter shown but not claimed is shown in an application prepared and about to be filed, relating to a special construction of the receiver represented in diagram and lettered D in Fig. 4, in this case. For the purpose of this present application it may be stated that my construction of the device D, is found shown and described in the above named application of February 27, 1892, Serial No. 422,956.

The central station device which I call conveniently the transmitter because it is the means for controlling the indications upon a distant indicator or receiver, is described as follows by reference to the drawings. The characters of reference are letters as far as possible. It is shown attached to a steam gage but it is evident that it may be applied to an ammeter, to certain forms of gas meter and to meters for measuring other forms of energy and supply. This will be apparent from the fact that the whole instrument is dependent for its action upon the arm $a$, which is attached to the same shaft as the needle $b$, of the steam gage which, of course, may be the needle of any measuring device. In line with the shaft of the said needle, is a second shaft $c$, which carries an arm $a'$, which, together with the arm $a$, is parallel to the plane of the needle, and perpendicular to the common axis of the two shafts $b'$, and $c$. The organization subsequently described is such that when the needle has been driven to any point on the scale, $d$, the arm $a'$ is propelled until the end thereof comes into contact with the arm $a$, whereby a circuit is caused to be closed, and certain auxiliary operations caused. $e$, is a sleeve upon the shaft $c$, carrying a radial armature $e'$, and an arm $f$, which in turn is pivoted to a pawl $g$, engaged with a ratchet wheel $h$. In the path of the pawl is a stop $i$, which determines the extent to which the pawl shall move, but also serves the more important function of guiding the pawl into the spaces between the teeth of the wheel $h$. A retractile spring $j$, for the pawl is also provided to assist in this action. The spring $j'$ serves to retract the arm and armature into their normal positions. The magnet $k$, with which the armature $e$, is intended to co-operate, is fastened to a yoke piece $l$, extending from the circular plate $m$, to the post $n$, whose lower end is connected to the same plate by a second bar $l'$ also carrying a magnet $o$. Fastened to the plate $m$, is a coil spring $p$ see Fig. 8, as to one end, while the other end is attached to the shaft $c$, upon which the wheel $f$, is secured. A smaller ratchet wheel $h'$ is also secured upon this shaft but is located at the other end which passes through the post $n$. The wheel $h'$ is engaged with a pendulum and escapement in the manner of a clock for the purpose of allowing the shaft $c$, to return with a moderated speed to its normal position when released. The tripping is effected by the magnet $o$, and its armature $e''$, which is so pivoted and attached to the arm $q$, that the latter releases the pawl $g'$ as soon as a current passes through said magnet. This organization is accomplished by providing the post $n'$ at right angles to the post $n$, and supporting therefrom a pivotal shaft $c'$ whose opposite end rests in a bearing in the plate $m$. The shaft $c'$ has an arm $f'$ at right angles thereto and carries the armature $e''$. The pawl $g'$ has a pin $i'$ projecting therefrom which is in contact with the lower beveled edge of the end of the arm $q$, so that when the latter is pulled downward, the pawl $g'$ is forced from the space between any two certain teeth. The spring $p$, having been wound up by the intermittent motion of the armature $e'$ propels the shaft $c$, in the opposite direction upon the tripping of the ratchet by the attraction of the armature $e''$. The arm $q$, is also a circuit interrupter, for upon its end is a piece of insulation $r$, which is in the path of a spring terminal $s$, bearing against a corresponding spring terminal $s'$. The springs $s$, and $s'$ are attached to opposite sides of the insulator $r'$. In the normal position, the two terminals $s$, $s'$ are in contact with each other. When the arm $q$, is pulled down, the two terminals $s$, $s'$ separate, and thereby open an electric circuit.

In order to illustrate the operation it is first necessary to describe the electric circuits and connections. These are indicated mostly by capital letters.

A, is an electric generator, including a clock circuit breaker, B, arranged so that at equal intervals, the circuit of the battery is interrupted. C, is a magnet in the same circuit and located below a suitable meter, D, of such a nature that when the armature E, of the said magnet is given a reciprocating motion, the needle F of the device will move gradually around to a certain point which depends for its location upon the number of times the circuit through the said magnet is interrupted. Subsequently, the needle may be set again to its normal position. The circuit, which may be called G, includes the springs $s$, $s'$ already described, and the magnet $k$, passing then to ground H. A branch circuit G' includes the circuit interrupter formed on the arms $a$, and $a'$ and shown in the diagram figure by the terminal points A', A''. The said branch G' is taken around the magnet $o$ and the circuit interrupter which consists of the terminals $s$, $s'$. When the needle of the gage, as for instance the needle $b$, which may as well be the needle of an electric meter, turns to any point on the scale $d$, the arm $a$, assumes a corresponding position. In the course of time, the clock B, being in operation, causes the circuit G to be closed, intermittently, at intervals of a small fraction of a second, or at shorter intervals, being at such a rate that the operation may be suitably fast, to prevent waiting being necessary. The consequence is that the magnet $k$, is intermittently energized and the wheel $h$, and shaft $c$, propelled. This is apparent from the fact that the alternate forward and backward motion of the pawl $g$, forces the wheel around, while the pawl $g'$ retains the wheel from returning under the action of the spring $p$, which is being wound up. As soon as the arm $a'$ on the shaft $c$, comes into contact with the arm $a$, the circuit G' being of less resistance than circuit G, is closed whereby the other circuit is broken, and the magnet $o$, energized. The reason for shunting the circuit G is to prevent the indicator D from indicating any higher reading than that of the needle $b$. It is necessary that the arm $a'$ should stop as soon as it reaches the position of the arm $a$, and this is accomplished because the magnet $k$ is cut out, the wheel $h$ stopped and immediately returned through the medium of the magnet $o$, to its original position. As the magnet $k$ is placed in a branch or shunt, by the closing of the current through the magnet $o$, and as the circuit through the magnet $k$ is interrupted at the terminals $s\ s'$ for the same reason, the needle of the receiver D stops in a position corresponding to that of the needle $b$. Therefore, the receiver will indicate at a distance, the reading of the needle $b$. As described, herein, the arm $a'$ is returned automatically to its first and original position and the needle of the receiver is returned to zero by hand, as a means of illustrating, in this application, the operation of the transmitter. In turn the terminals $s,\ s'$ are separated and the pawl $g'$ tripped, so that the arm $a'$ returns to its normal position, and immediately, begins to go again toward the arm $a$, which on account of variation of the current being measured or of the steam being gaged, may have changed or not changed its position. However, wherever it is the arm $a'$ will move up to it and close the circuit $G'$, as before described. This operation will be repeated every few minutes or if desired every few seconds according to the adjustment of the various parts and speed of the clock B. It follows, therefore, that any person at a distant point where the indicator D is, may know the pressure of steam acting in the gage, whose needle is $b$. It is important to notice that when the arm $q$, is pulled down by the armature and magnet, respectively $e''$ and $o$, the pin $i'$ on the pawl $g'$ enters the notch $q'''$ in the end of the arm $q$, by the action of the spring J, so that said arm is held down after the armature has once been attracted. There is a pin $q'$ on the wheel $h$, that strikes the arm $q$, during the recoil of the spring $p$, so that the arm $q$, is thereby returned by this pin to its original position. At the same time, the insulator $r$, allows the spring terminal $s$ to come again in contact with the terminal $s'$, and close the proper circuit which before was opened by the separation of the said contacts. The reason why this operation is such, is that the circuit through $s,\ s'$ may remain open until the wheel $h$, has returned to its original position in the normal state. Another reason is that the arm $q$, may serve to hold away the pawl $q'$ until the wheel has returned to its normal position. The spring $q''$ is not in the ordinary sense the retractile spring, as it serves simply to partially neutralize the weight of the armature and arm $q$. If the circuit through terminals $s,\ s'$ were closed before the wheel $h$ had regained its original normal position, the maknet $k$, would begin to feed the wheel around in the opposite direction before it would be possible to do so. It should be understood that the pin $g'''$ resting against the projection $g''$ is fastened to the plate $m$, so that, as soon as the armature $e'$ moves upward, the projection tends to leave the said pin, but the spring $j$, pulls the pawl $g$ down into the notches of the wheel $h$, which pawl is normally held out of the notches by the projection $g''$, and pin $g'''$.

The circuit breaker operated at and by the clock B is of such a nature, well known in the art, that the circuit G, is first opened and then closed with a rate dependent upon the manner in which the clock work is set. For the purpose of operation and illustration, it makes no difference what rate this may be. The circuit G, is opened and closed intermittently. At the beginning of the operation, that is, in the normal condition for working, the same circuit G, is closed at the terminals $s,s'$. The circuit G, being closed at the terminals and clock simultaneously, is closed throughout, and includes the following elements, to wit, the generator A, the circuit closer at B the magnet C, of the indicator D, the terminals $s,\ s'$, the magnet $k$, and the ground H. Let it now be assumed that the circuit is in a condition so that it is closed throughout the path lettered G. The armature of the magnet moves toward the magnet $k$. The arm $f$, is consequently moved to the left with a continuous motion until the armature $e'$ has been attracted throughout the full distance to which it is capable of moving. Normally, as has been stated, the pawl $g$, is out of contact with the ratchet $h$, so that at the proper time the said ratchet wheel $h$, may move or rotate to the right without hinderance from the said pawl. It is the object of the construction hereinbefore set forth, that the pawl should enter between the teeth of the ratchet $h$ as soon as possible after the same begins to move to the left, which it will do as soon as the arm $f$, moves, because it passes away from the pin $g'''$. The proper operation is accomplished by the construction as explained. As soon as the arm $f$, moves, the pawl is pulled down into the spaces between the teeth, by the spring $j$, which is continually under tension. While the arm $f$, is in the normal position as shown in either Fig. 1, or 4, the pawl cannot touch the wheel $h$, because of the projection $g''$, on the said pawl, pressing upon the pin $g'''$ which is attached rigidly to the plate $m$. But as soon as the arm $f$, moves forward, it is evident that the pawl $g$, will be pulled between the teeth, because the projection $g''$ and pin $g'''$ tend to move relatively away from each other. This is done very quickly, and consequently, the wheel $h$, is propelled to the distance of one tooth by the said pawl. When the pawl $g$, returns, by the action of the spring $j'$, and the opening of the circuit G by the circuit closer in the clock B, the pin $g'''$ and projection $g''$ come together as originally, and the consequence is that the pawl is held out of the teeth. This operation of the propulsion of the wheel is repeated as often as the armature $e'$ is attracted to the magnet $k$. The pin $i$, is merely an assistant in guiding the pawl $g$, to the teeth and as a stop for limiting the motion of the pawl $g$. It, as it were, steadies the motion of the pawl. The spring $j'$ serves in the operation as the retractor for the arm $f$. If it were not for the application of the pin $g'''$, as described, the spring $j$, would pull the pawl $g$ between the teeth at all times, but this would be detrimental to the operation. In conclusion on this point in the operation, it may be stated that as often as the circuit closer at B, closes the circuit, and while the terminals $s$, $s'$ are also closed, the pawl propels the wheel $h$, repeatedly in one direction. After a certain and indeterminate period of time, the terminal $A''$ on the arm $a'$ comes into contact with the terminal $A'$ on the arm $a$ or steam gage needle $b$ attached thereto and the circuit is closed through that path which is lettered $G'$. This may be called a branch or shunt or short-circuit according to the preferred terms and relative resistances of the magnets $k$, and $o$. For the sake of clearness it may be stated that $G'$ is a circuit of the battery A and passes around and not through the magnet $k$, or circuit closer whose terminals are $s$, $s'$, and does pass through the magnet $o$, and includes the terminals $A''$, $A'$. The needle $b$, and therefore the contact terminal $A'$, is at a position which depends upon the pressure of the steam or upon some force such as an electric current which it is intended to indicate. Inasmuch as the wheel $h$, is propelled, and the arm $a'$ radiates from its arbor, and lies in the path of the arm $a$, the two electrical terminals $A'$, $A''$ will finally come into contact with each other, and therefore the magnet $o$ will be energized. The arm $q$, will therefore be pulled downward. The insulation $r$, on the end of the said arm, will act upon the spring $s$ which is also an electric terminal and will force the two terminals $s$, $s'$ apart and consequently the circuit G, will be broken so that no current will pass through the magnet $k$, and consequently, also, the wheel or ratchet $h$, will be no longer propelled in the direction before mentioned. The said ratchet will stop. The arm $q$, will also push the pin $i'$ away on account of the slope given to the end of the same. The pin $i'$ being fastened to the pawl $g'$, the latter is thrown away from the teeth in the ratchet $h$, which will rapidly return to its original position on account of the coil spring $p$, which has been wound up by the rotation of said ratchet. In order that this recoil or return of the wheel $h$, may not be too sudden and full of shock, the pendulum escapement $h''$ and ratchet $h'$ are provided. The arm $q$, remains in the lower position and the terminals $s$, $s'$ apart, until the pin $q'$ on the wheel $h$, knocks it upward, thereby again closing the terminals $s$, $s'$ and allowing the pawl $g'$ to enter between the teeth by the action of the retractile spring $q'$ which connects the pawl $g'$ to the insulation $r$. The reason why the arm $q$ remains down for awhile, is that the groove or notch $q'''$ is cut into the end of the said arm $q$. The pin $i'$ enters this notch and retains thereby the whole arm $q$, and such parts as are attached thereto, until, as above stated, the pin $q'$ acts as a hammer to remove the arm $q$ to its original position. Consequently, the terminals $s$, $s'$ come together again because the terminal $s$, is elastic and springs back until it touches the terminal $s'$. It is evident that by the tripping of the pawl $g'$, the terminals $A'$, $A''$ separate, and the magnet $o$, becomes de-magnetized. Inasmuch as the circuit closer at B, is continually operating, the magnet $k$ continues to be intermittently energized, and the wheel $h$, to be propelled as before, and therefore, the terminals $A'$, $A''$ will again be brought together.

Attention is now invited to the indicator D. The internal construction of this is not shown because the same has nothing to do with my invention. Every time the armature E, is attracted, the needle of the indicator moves through one degree, and the number of degrees corresponds to that on the meter seen in Fig. 5. It may have, inside, a pawl and ratchet exactly like that combination shown in Fig. 1. That is, the armature $e'$ may correspond to the armature E, and the magnet $k$ to the magnet C, and the indicator may contain a ratchet wheel like $h$, attached and controlling the needle of the indicator. It is only necessary to state here, that the indicator D is such a device that its needle will move a degree each time the magnet C is energized. It is apparent, therefore, that the indicator D, will indicate at intervals the same number of degrees as indicated by the meter in Fig. 5. As soon as the needle of the indicator D stops permanently, it may, for the sake of illustration in this application, be returned to its starting point by hand. It is an independent invention to provide means to return it automatically and that is not shown in this application.

The arrow in Fig. 4, carrying the terminal $A'$ represents in diagram the needle $b$, because, if the full needle were shown, it would make more confusion of lines. The terminals $A'$, $A''$ are one pair of details or elements of the diagram and may in practice be attached directly to the arms $a$, and $a'$ respectively, or the terminal $A'$ may be represented in diagram as being carried by the needle $b$, in order that the diagram may be as free from mechanical structure as possible, and only the electrical features shown. This seems reasonable as the mechanical details are shown so thoroughly in the other figures. The terminal $A'$ is for instance not the same thing as the arm $a'$, but is carried thereby. This is the reason that the letters are different.

The use of the device D may now be clearly understood, for it will indicate at times the same reading as the needle $b$, which may be miles away. Very briefly but comprehensively stated, the results are; when the needle $b$, travels to any degree on the scale $d$, the arm $a'$ travels until it meets the arm $a$, which has moved as far as the needle $b$. The needle at indicator D has moved synchronously with the arm $a'$ and needle $b$, and therefore indicates the same number of degrees. When it stops, it may be moved back by hand, so that it may repeat its journey around the scale. Every few seconds the indicator receives the readings of the distant meter and therefore the device herein called a transmitter serves as such because it transmits the readings of any suitable meter to a distant point. Inasmuch as the pawl $g$ is held out of engagement with the teeth or notches of the wheel $h$, the pawl $g$ is free to return with the arm $f$ to its original position after it has propelled the wheel $h$ to the distance of one tooth. Another and more important reason, is that the wheel $h$ may return to its original position when released by the pawl $g'$; which as already set forth, retains the wheel $h$ at each new position given to it by the pawl $g$; but which is held temporarily from the teeth of said wheel as soon as the armature $e''$ is attracted to the magnet $o$.

I claim as my invention—

1. In combination with the needle of a steam gage or the needle of a similar gage in which energy is indicated by the position of a pointer, of an arm parallel to said needle and attached to the same shaft therewith, a second shaft whose axis coincides with the projection of the first, and carrying two ratchet wheels $h$, and $h'$, the former having two pawls, a propelling and tripping pawl; a sleeve $e$, upon the shaft which carries one of said wheels, and provided with an armature radiating therefrom, a magnet within inductive action to the said armature, an arm projecting from the said armature, which is supported by a pivot, which consists of the second named shaft, a second magnet $o$, an armature therefor, pivoted and connected to an arm $q$, which controls a circuit closer and the said tripping pawl, means, such as a clock, for operating an intermittent circuit interrupter which is included in circuit with the first named magnet and in branch circuit to the magnet $o$, electric terminals in said branch circuit, and attached respectively to the said first named arm, $a$, and to an arm $a'$ on the central shaft $c$, already mentioned as carrying the wheels $h$, $h'$, an indicator D controlled by the said intermittent current which passes through the interrupter on the clock B, and a coil spring $p$, acting against the turning of the wheel $h$ by the pawl $g$, the wheel $h'$ being engaged to an escapement and pendulum.

2. In combination with the needle of a measuring gage, of an electric terminal $a$, attached thereto, and lying in the path of a second terminal $a'$, a magnet $k$ controlling the movement of the said terminal $a'$, a circuit breaker formed of the terminals $s$, $s'$ in circuit with said magnet $k$, a magnet $o$, in a branch circuit to said first named circuit and including said terminals $a$, $a'$ in its own circuit, means for controlling said terminals $s$, $s'$ and governed by said magnet $o$, a spring acting against the operation of said magnet $k$, a pawl and ratchet wheel actuated by said magnet $k$ and acting in opposition to said spring, and a projection to the armature of the magnet $o$, connected with said pawl for tripping the same in the manner and for the purpose set forth in the specification and drawings.

3. In combination with the needle of a measuring instrument such as a steam gage, of an electric device for the purpose described, consisting of a shaft $c$, carrying ratchet wheels $h$, $h'$, upon opposite ends thereof, a loose sleeve $e$, upon the shaft and provided with a radial armature, within inductive action of a magnet $k$, a radial arm carrying a ratchet or pawl $g$, the said arm radiating from said sleeve, and the pawl engaging with said wheel $h$, retractile springs $j$, and $j'$ respectively for said pawl $g$, and for the arm which is lettered $f$, a retractile coil spring $p$, acting against the rotation of the shaft $c$, a second pawl $g'$ engaged in the wheel $h$, and means, such as a magnet and its armature for releasing said pawl from engagement with said wheel, the wheel $h'$, being engaged with an escapement and pendulum.

4. In combination with the needle of a steam gage or similar instrument, of an arm $a$, projecting therefrom and forming the terminal of an electric circuit, a second arm $a'$ and shaft $c$, for supporting the same, the second arm lying in the path of the first arm, and also forming the terminal of an electric circuit, a retractile coil spring $p$, acting against the rotation of the shaft $c$, one end being fastened to a stationary object such as the bed plate $m$ and the other end to the said shaft, a sleeve $e$, upon the shaft and having two radial projections one of which is the arm $f$, and the other the armature $e$, a magnet $k$, for the armature, and a pawl $g$, pivoted upon said arm and engaged with a ratchet wheel $h$, which is mounted and fixed upon said shaft $c$, a pawl $g'$ engaged with said wheel and acting to retain the same in any position to which it may be propelled by the action of the energized magnet $k$, a tripping device for said pawl $g'$ and means for operating said device consisting substantially of an electro-magnet and its armature, an electric terminal $s$, lying in the path of a projection $q$, to the last named armature which is lettered $e''$ and in contact with another terminal $s'$, a periodical circuit breaker and maker controlled by clock work, B, a magnet C controlling an indicating device D, and an electric generator in a main circuit with the said terminals $s$, $s'$ and a magnet $o$, and terminals $a$, $a'$, in a branch circuit around the magnet $k$ and the terminals $s$, $s'$.

5. The combination of an electro magnet and armature therefor, a shaft $c$, parallel to the length of said armature, a sleeve $e$, on the shaft, and provided with a radial projection to which is attached the said armature, a ratchet wheel on the said shaft, a radial arm $f$, projecting from the said sleeve, a pawl carried and pivoted on the arm $f$, and just escaping the teeth of the ratchet wheel, a fixed pin $g'''$, bearing upon a projection $g''$ on the pawl, and a spring $j$, connecting the pawl $g$, to the arm $f$, and a second spring $j'$ connecting the arm $f$, to a fixed point., the spring $j$, being normally under tension., and a stop $i$, bearing upon the pawl $g$ on the opposite side from the wheel $h$.

6. The combination of a ratchet wheel engaged with an armature of an electromagnet, of a spring acting in opposition to the action of the magnet and engaged with the said wheel, a second magnet whose armature is provided with an arm extending to the rim of the said wheel, and having a notch in the end thereof, a pawl provided with a pin resting upon the end of the arm in the path of the said notch and a second pin upon the wheel in the path of the said arm, all arranged as and for the purpose set forth in the specification and drawings.

7. The combination with the indicating needle $b$ of a meter, such as a steam gage, electric meter &c; of an electric magnet $k$, a rotating arm $a'$ driven by said magnet $k$, and moving in the path of an arm, $a$, carried on the arbor of the needle; a second magnet C in circuit with the first magnet and armature E, a needle of an indicator D driven by said second magnet and located at a distant point from the first and moving synchronously therewith; and means for stopping simultaneously, the two magnets at the time when the arm $a'$ comes in contact with the arm $a$.

8. The combination with the indicating needle $b$ of a meter, such as a steam gage, electric meter, &c; of an electric magnet $k$, a rotating arm $a'$ driven by said magnet $k$, and moving in the path of an arm, $a$, carried on the arbor of the needle; a second magnet C and armature E, a needle of an indicator D driven by said second magnet and located at a distant point from the first; and means for stopping simultaneously, the armatures of the said two magnets at the position where the arm $a'$ comes in contact with the arm $a$, said means consisting of an electric generator and an electro magnet $o$ energized by a current from said generator, which current is closed at the points of contact of the said arms $a$ and $a'$.

9. The combination with the indicating needle $b$ of a meter, such as a steam gage, electric meter, &c; of an electric magnet $k$, a rotating arm $a'$ driven by said magnet $k$, and moving in the path of an arm, $a$, carried on the arbor of the needle; a second magnet C and armature E, a needle of an indicator D driven by said second magnet and located at a distant point from the first and having armatures vibrating synchronously with each other and means for stopping simultaneously, the said two armatures at the position where the arm $a'$ comes in contact with the arm $a$, said means consisting of an electric generator and an electro magnet $o$ energized by a current from said generator, which current is closed at the points of contact of the said arms $a$ and $a'$, the said magnet being located in a short circuiting circuit around the magnet $k$ which controls the arm $a'$, and around a circuit closer which is controlled by the said magnet $o$, and which is in circuit with the magnet $k$.

10. The combination of an intermittent circuit interrupter in circuit with the magnet of a suitable telemeter receiver, and generator; a magnet $k$ and armature $e'$, driven by the intermittent current from said generator; an arm $a'$ driven by said magnet $k$ and moving toward an arm attached to the needle of said gage; a circuit controlled by said arm $a'$ and normally open; a magnet $o$ in circuit with said circuit closer; a circuit interrupter controlled by the armature of said magnet $o$; the last named interrupter and magnet $k$ being in a branch circuit to that of the magnet $o$ and said circuit closer; all for the purpose described; and means for returning the arm $a'$ to its normal position after it has come in contact with the arm $a$.

In testimony that I claim the foregoing as my invention I have signed my name, in presence of two witnesses, this 9th day of February, 1892.

CHARLES WILLIAM AYTON.

Witnesses:
EDWARD P. THOMPSON,
GEORGE T. MIATT.